United States Patent [19]

Ozawa

[11] 3,752,938

[45] Aug. 14, 1973

[54] MAGNETIC RECORDING AND REPRODUCING APPARATUS HAVING ELECTRICAL SWITCHING INTERLOCKED WITH MECHANICAL CONTROLS TO SENSE THE PRESENCE OR ABSENCE OF A CARTRIDGE TAB

[75] Inventor: Yasuo Ozawa, Tokyo, Japan

[73] Assignee: Sony Corporation, Tokyo, Japan

[22] Filed: July 29, 1971

[21] Appl. No.: 167,171

[30] Foreign Application Priority Data

Aug. 1, 1970 Japan ................................ 45/76738 (utility model)

[52] U.S. Cl. ..... 179/100.2 Z, 179/100.2 D, 274/4 C

[51] Int. Cl. ........................ G11b 15/04, G11b 23/04

[58] Field of Search .............. 179/100.2 D, 100.2 Z; 274/4 B, 4 C, 11 C; 242/55, 19 A, 199, 200; 317/157.5

[56] References Cited

UNITED STATES PATENTS

| | | | |
|---|---|---|---|
| 3,485,500 | 12/1969 | Loeschner et al. | 179/100.2 Z |
| 3,702,907 | 11/1972 | Sato | 179/100.2 Z |
| 3,696,217 | 10/1972 | Motoyama | 179/100.2 D |
| 3,492,005 | 1/1970 | Ueno et al. | 274/4 |
| 2,466,514 | 4/1949 | Vagtborg | 179/100.2 Z |
| 3,037,093 | 5/1962 | Nowlan | 179/100.2 D |
| 3,617,065 | 11/1971 | Camras | 179/100.2 Z |
| 2,612,565 | 9/1952 | Heller | 179/100.2 Z |
| 3,650,378 | 3/1972 | Kakiuchi | 274/4 B |

*Primary Examiner*—Bernard Konick
*Assistant Examiner*—Alfred H. Eddleman
*Attorney*—Lewis H. Eslinger et al.

[57] ABSTRACT

A cassette recorder/reproducer having a feeler to determine the presence or absence of a tab indicating permanent recording and means to deactivate the feeler when using a teaching cassette having one track of prerecorded teaching material and a second track on which the student may record and later play back his own material. The switching means also allows the magnetic head that operates on the teacher's track to be used either as a playback or recording head for cassettes other than instructional ones. The switching means are controlled by apparatus actuated when a cassette is removed at which time the circuits are automatically switched for non-instructional use and must be deliberately set for instructional use if that is desired.

11 Claims, 8 Drawing Figures

Patented Aug. 14, 1973 3,752,938

4 Sheets-Sheet 1

INVENTOR.
YASUO OZAWA
BY
ATTORNEY

INVENTOR.
YASUO OZAWA
BY [signature]
ATTORNEY

Patented Aug. 14, 1973 3,752,938

4 Sheets-Sheet 3

INVENTOR.
YASUO OZAWA
BY Lewis H. Eslinger
ATTORNEY

INVENTOR.
YASUO OZAWA
BY
[signature]
ATTORNEY

MAGNETIC RECORDING AND REPRODUCING APPARATUS HAVING ELECTRICAL SWITCHING INTERLOCKED WITH MECHANICAL CONTROLS TO SENSE THE PRESENCE OR ABSENCE OF A CARTRIDGE TAB

BACKGROUND OF THE INVENTION

1. Field of the Invention

This invention relates to magnetic tape recorder/-playback apparatus for multiple modes of recording and playback. In particular, it relates to electrical switching circuits and interlocked mechanical controls therefor associated with magnetic tape cassette recording/playback apparatus usable with either regular cassettes or instructional cassettes.

2. Prior Art

Reel-to-reel self-contained magnetic cassettes have become increasingly popular in recent years as means for recording various types of information for later playback. In some cases, the information is not to be erased; but in other cases, the information is of only temporary nature and it is expected that new information will later be recorded on the same tape. In accordance with worldwide standards, each cassette has a small tab that can be removed, if desired, to expose a cavity in the cassette housing, and cassette apparatus capable of both recording and playing back is provided with a feeler to probe the region of the tab and determine whether the tab is still in place or whether it has been removed so as to expose the cavity. If it is intended to retain the recorded information, the tab is removed and the feeler will actuate the interlock mechanism to prevent the recording part of the apparatus from being used. This makes it impossible to record new information in place of that which was supposed to be permanent. On the other hand, if the tab is still in place, the feeler will sense its presence and will allow either the recording or playback part of the apparatus to be used.

One of the growing uses for magnetic tape cassettes is in the instructional field, particularly in language laboratories. The magnetic tape in cassettes is wide enough to accommodate several individual tracks on which information may be recorded. Typically there are four such tracks, and the cassettes are usually arranged to be symmetrical so that they can be placed in the recording/playback apparatus in either of two ways. In one way, the recording and playback will be done with the tape moving in one direction and two of the tracks will be utilized. If the cassette is removed from the apparatus and reinserted in an inverted position, the tape will run in the other direction and the other two tracks may be used for recording or playback. Sometimes it is necessary to use more than two tracks at one time, and this is particularly true in the case of instructional cassettes. Such cassettes are then suitable for use only in one direction and must be rewound to the starting point rather than being inverted and allowed to run back in the same manner as ordinary cassettes. Special arrangements must be made for such multi-track cassettes, and the apparatus in which they are used is normally not capable of accommodating ordinary cassettes.

BRIEF DESCRIPTION OF THE INVENTION

In accordance with the present invention, a cassette tape recorder/playback mechanism is provided with two magnetic transducing heads aligned with two tracks on the cassette tape. Two separate switching means are connected to the magnetic transducing heads, one to switch the apparatus between normal usage and instructional, or teaching, usage, and the other to switch the apparatus between recording and playback modes of operation. The apparatus is provided with a receptable space for a tape cassette and with means to drive the tape and to control the operation of the switches automatically. The latter apparatus includes a sensing mechanism to be actuated by removal of the cassette from the receptacle in which it rests while running and to set the switches, if necessary, so that the next tape cassette inserted into the receptacle will be handled by the apparatus as if it were a normal cassette rather than an instructional cassette. The apparatus also includes means to change the internal linkages as required for operating an instructional cassette.

DETAILED DESCRIPTION OF THE INVENTION

Figure 1:
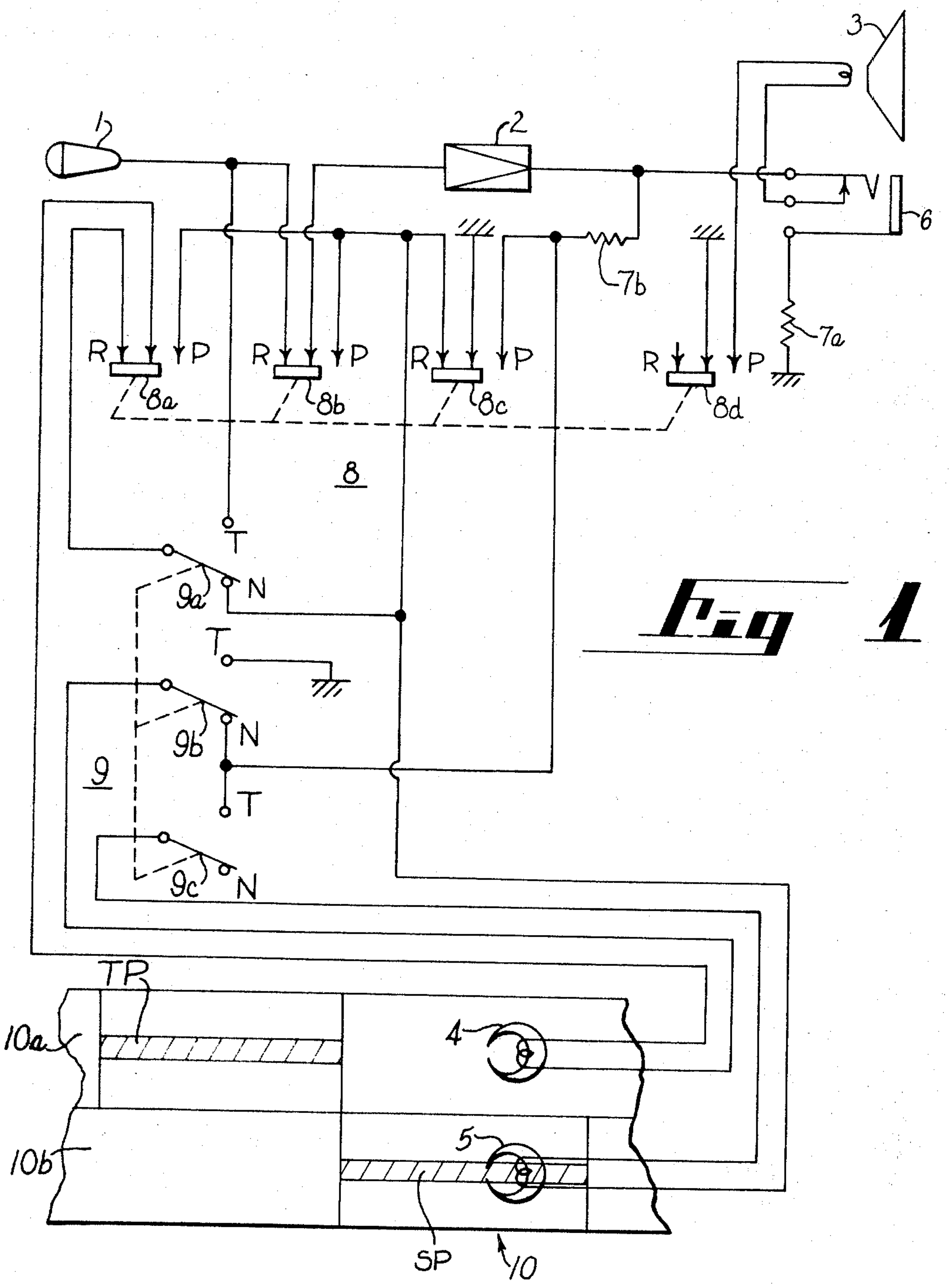
FIG. 1 is a schematic circuit diagram, partly in block form, of a tape recorder/playback mechanism connected according to the present invention.

The tape recorder/playback mechanism shown in FIG. 1 includes a microphone 1 and a power amplifier 2 capable of energizing either a loudspeaker 3 or a magnetic transducing head, such as the head 4 or head 5. An earphone jack 6 is connected to the output of the amplifier 2 and to the loudspeaker 3 to disconnect the loudspeaker when an earphone is plugged into the jack. A suitable resistor is connected to the output of the amplifier 2 depending on whether the output is supplied to an earphone or to the loudspeaker 3. If an earphone is used, the resistor is resistor 7*a;* if the earphone is not used, the resistor is resistor 7*b*. A switch 8 having four movable contacts, or poles, 8*a*–8*d* each of which has two positions, or throws, is connected to control the operation of the foregoing apparatus between the playback and recording modes of operation. Another switch 9 having three movable arms 9*a*–9*c*, each of which also has two positions indicated as N and T, is connected to control the operation of the apparatus between a "normal" condition and a "teaching" condition.

The magnetic heads 4 and 5 are positioned to record on two tracks 10*a* and 10*b*, respectively, of a magnetic tape 10. In the case of an instructional cassette, the tape track 10*a* will be referred to as the "teaching track" on which the instructional signal is recorded. The track 10*b* is referred to as the "student's track"

and is used by the student for recording his own material and later playing it back. Usually the material to be recorded is the student's voice although the material may be of another nature if desired.

When the apparatus is used for instructional purposes, the magnetic head 4 operates only as a playback head to reproduce the signal recorded on track 10*a* while the magnetic head 5 may be used for either playback or recording depending upon the mode of operation selected by the switch 8. On the other hand, when the apparatus is used with normal cassettes, the head 4 may be used for either playback or recording and the head 5 is not used at all.

In order to set the apparatus for normal operation, the switch 9 must be placed in the position shown in FIG. 1 so that the arms 9*a* and 9*b* connect with their respective N terminals. The third arm 9*c* also connects with its N terminal, but this terminal is not connected to any other part of the circuit. The arm 9*c* is connected to one end of the magnetic coil for the head 5, and, therefore, it is apparent that this head is not in operation, either for playback or recording, when the switch 9 is in the "normal" position.

If it is desired to record information o the tape 10 with the apparatus set for "normal" usage, the switch 8 must be placed in the position shown so that all the movable contacts 8*a*–8*d* connect with the center contact and with the fixed contacts marked R. This causes the microphone 1 to be connected through the movable contact 8*b* to the input of the amplifier 2. The output of the amplifier 2 is connected by way of the resistor 7*b* to the arm 9*b* of the switch 9 and through that arm to the magnetic head 4. The other side of the magnetic head 4 is connected through the contact 8*a*, the arm 9*a* and the contact 8*c* to ground. The head 4 is thus set for recording operation. In this condition, one end of the voice coil of the speaker 3 is connected to an open circuit at the contact 8*d* and so the sound may be monitored only by earphones plugged into the jack 6.

When it is desired to play back the recorded information, the switch 8 must be thrown to its alernative position in which the contacts 8*a*–8*d* are connected to the fixed contacts P. In this position, the microphone 1 is not connected to any other part of the circuit but instead one side of the magnetic head 4 is connected by way of the contacts 8*b* and 8*a* to the input circuit of the amplifier 2. The other side of the magnetic head 4 is connected through the switch arm 9*b* and the contact 8*c* to ground. The circuit for the head 4 is thus set for playback operation. The contact 8*d* connects one side of the speaker 3 to ground, which completes the speaker circuit and makes it possible for sound to be reproduced either by the speaker 3 or by earphones plugged into the jack 6.

For instructional operation, the switch 9 must be thrown to its alternative position so that each of the arms 9*a*–9*c* connect with the respective T terminals. If the switch 8 is placed in the "record" mode, which is the position shown in FIG. 1, one side of the magnetic head 4 is connected by way of the contact 8*a*, the arm 9*a*, and the contact 8*b* to the input of the amplifier 2. The other side of the head 4 is grounded via the arm 9*b*. At the same time, the microphone 1 is also connected through the contact 8*b* to the input of the amplifier 2 in parallel with the head 4. The circuit for the speaker 3 is not completed, and, therefore, no sound can be reproduced by the speaker although sounds can be reproduced by earphones plugged into the jack 6. This prevents undesired feedback from the speaker 3 to the microphone 1. The output of the amplifier 2 is connected by way of the resistor 7*b* and the switch arm 9*c* to one side of the magnetic head 5. The other side of the magnetic head is connected through the contact 8*c* to ground so that when the apparatus is being used for instructional purposes and in the "record" mode the head 4 will play back information recorded on track 10*a* and the head 5 will record information from both the microphone 1 and the head 4 on the track 10*b*.

Finally, when the apparatus is being used for instructional purposes and it is desired to play back the information that has been recorded on track 10*b*, the switch 8 must be thrown to its "playback," or P, position. In this position, the microphone 1 is disconnected and the circuit for the loudspeaker 3 is completed by connecting one side of the loudspeaker to ground through the contact 8*d*. One side of the head 4 is connected by way of the contact 8*a* and the contact 8*b* to the input of the amplifier 2. The other side of the head 4 is connected to ground, and so that head 4 is in condition to act as a pickup head for information recorded on track 10*a*. At the same time, one side of the magnetic head 5 is connected by way of the contact 8*b* to the input of the amplifier 2. The other side of the magnetic head 5 is connected by way of the arm 9*c* and the contact 8*c* to ground. Thus, the magnetic heads 4 and 5 are connected in parallel to the input of the amplifier 2 when the apparatus is operated for instructional purposes and in the "playback" mode.

The normal way of using the apparatus of FIG. 1 for instructional purposes is to play back a section of track 10*a* of the tape 10 through the magnetic head 4 so as to allow the student to listen to the teacher's instructions. In the case of language instructions, it is customary for the student to play a word or a few words or a short passage of information by the teacher and then to attempt to repeat as precisely as possible those same words. With the apparatus set for the teaching condition and the record mode, the magnetic head 4 will reproduce information from the track 10*a*. At the end of a prescribed presentation indicated as the teaching program TP, the student is supposed to record his own attampt to duplicate the instructor's words. The student's attempt is then recorded by the magnetic head 5 as the student's program SP on track 10*b*. After the entire recording, or perhaps a part of it, has been finished, the student is expected to rewind the tape and listen again with the apparatus still set for the teaching condition but in the playback mode. In this mode, the student will hear first the teaching program TP and then the student program SP and will be immediately away of any deficiencies in his performance.

When the apparatus of FIG. 1 is to be used with normal cassettes as opposed to instructional cassettes, the switch 9 must be set accordingly. Then the track corresponding to track 10*a* of a normal cassette can be played back by way of the magnetic head 4 or information can be recorded on track 10*a* in response to signals from the microphone 1 applied through the amplifier 2 to the magnetic head 4.

As is well known, cassettes have means to control the operation of recording/playback apparatus to prevent new information from being recorded over information that is supposed to be permanent. Such means include small tabs placed at predetermined locations on the cassette housing. The recording/playback apparatus has feeler means to determine whether the tabs are still in place or have been removed. If one of the tabs has been removed, the feeler mechanism is connected to the recording portion of the apparatus to prevent it from operating to record new information on one of the tracks of the cassette tape. If the other tab has been removed, information on the other track will also be protected by having the feeler disable the recording apparatus.

Teaching cassettes must, of course, have at least one of the tabs removed so as to prevent the instructional information on the track 10*a* from being erased if the cassette is inadvertently placed in a normal cassette recording/playback device. In addition, the apparatus of the present invention must be arranged to have a feeler that will be actuated when the apparatus is operated in its normal condition to prevent recording over supposedly permanent information on an ordinary cassette. However, when a teaching cassette is placed in the machine, this feeler mechanism must be rendered inoperative in order to allow the student to record his own information. The student's information is recorded on track 10*b*, which is normally the track that would be operated when the cassette was inverted so as to cause the tape 10 to run in the reverse direction. Thus, one of the two tabs of an instructional cassette should be removed to prevent the instructional information from being obliterated if that cassette happens to be inserted into an ordinary recording/playback cassette machine, but the other tab need not be removed unless the student wishes.

The apparatus shown particularly in FIGS. 2–6 is the essential apparatus to control feeler operation to allow the cassette machine to be used for instructional purposes or for reproducing sound from a normal cassette. As is shown particularly in FIG. 2, the playback and recording heads 4 and 5 and an erasing head 101 together with a pinch roller 105 are mounted on a carriage 102 that can be moved between an inactive position and an active position. The carriage is shown in its active position in which the recording heads 4 and 5, the erase head 101, and the pinch roller 105 are operatively disposed with respect to a cassette 11.

The cassette, which is shown in broken lines since it is not a permanent part of the machine, is provided with two reel hubs 11*a* and 11*b* and a removable tab 11*c* on the rear surface thereof.

A detecting bar 14 is slidably mounted on the chassis of the machine by a pair of guide pins 151*a* and 151*b* that engage corresponding slots 152*a* and 152*b* on the bar 14. The bar has a feeler 14*a* bent around behind the location of the cassette 11 and in line with the location of the tab 11*c*. The bar 14 is resiliently biased by a spring 15 to urge the feeler 14*a* toward the location of the tab 11*c* so that the bar would either be stopped if the tab were in position or would be able to move farther forward if the tab had been removed. The other end of the bar 14 extends to a position adjacent the end of a slide 110.

Figure 2:
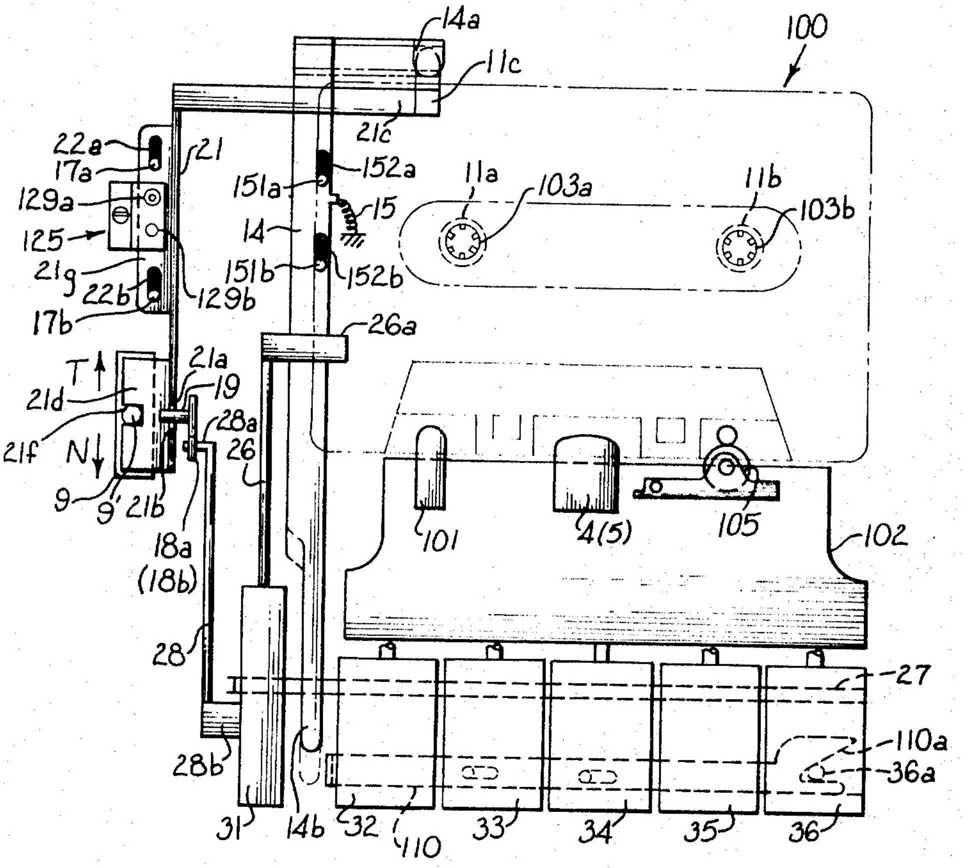
FIG. 2 is a plan view of some of the interconnecting linkages necessary to control the operation of tape recorder/playback apparatus of the present invention.
Figure 4:
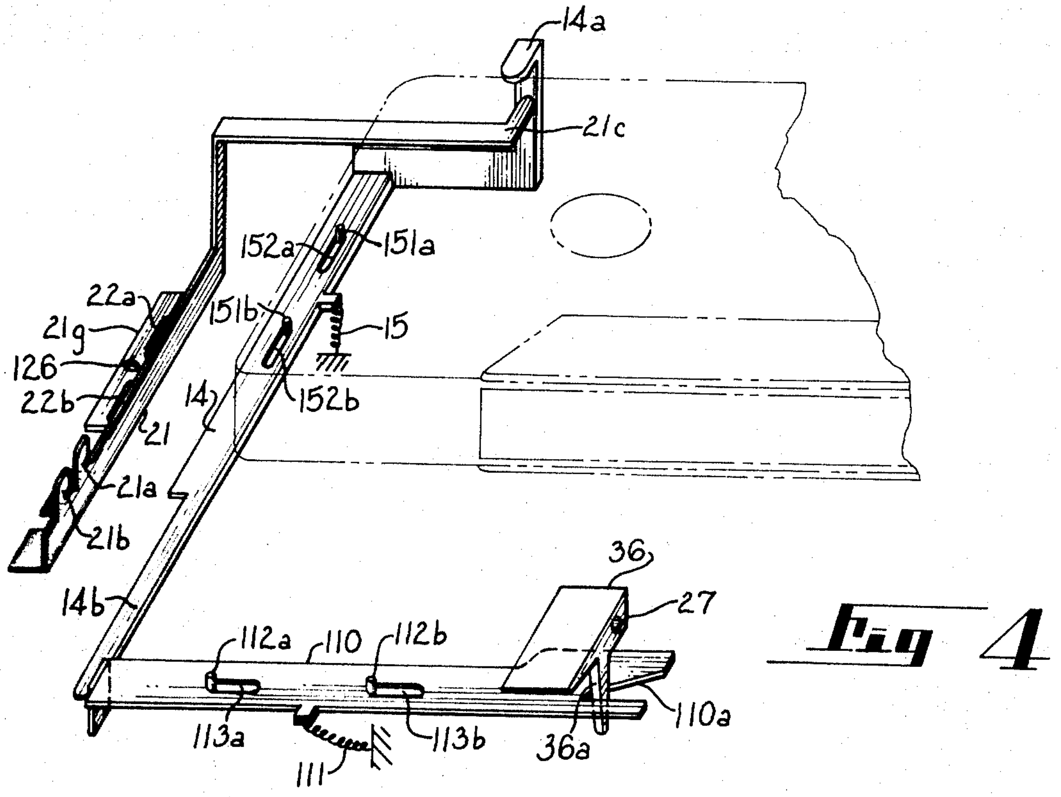
FIG. 4 is a perspective view of some of the components in FIGS. 2 and 3.
Figures 5, 6:
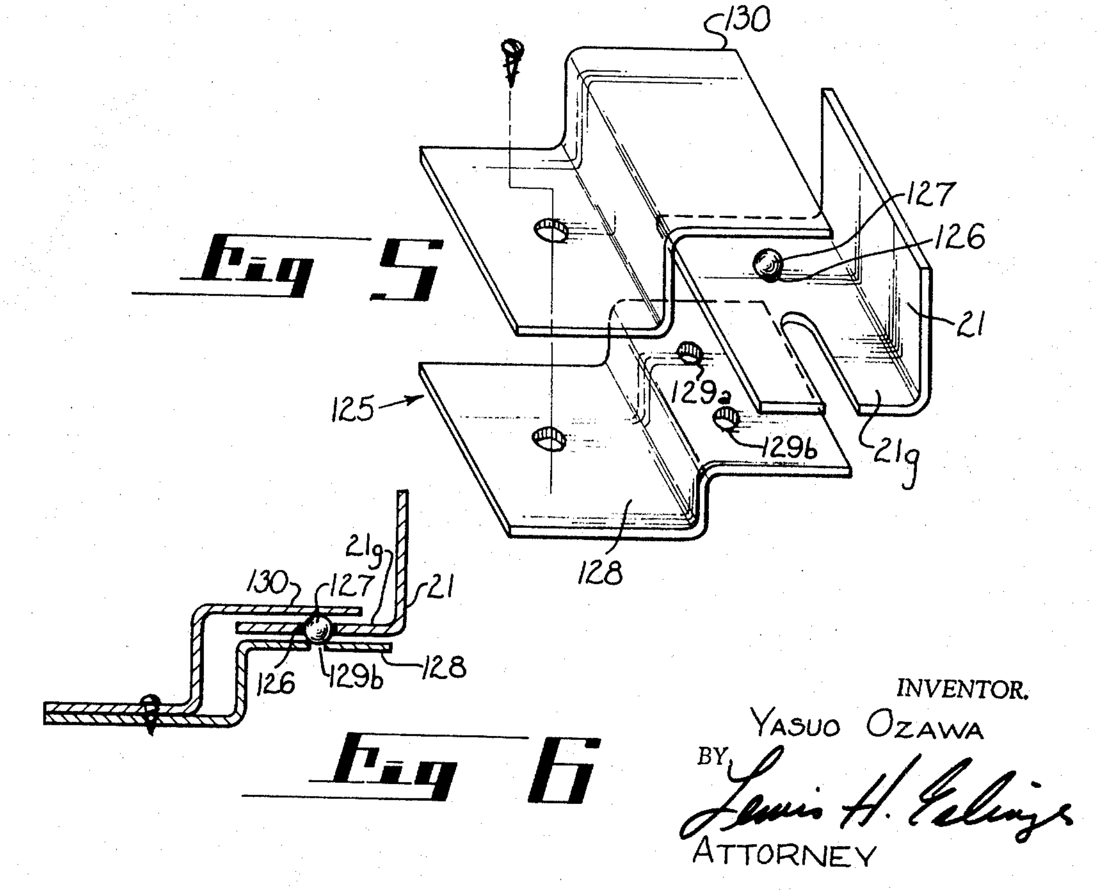
FIG. 5 is an exploded view of a detent apparatus used in the device shown in FIGS. 2—4.
FIG. 6 is a cross-sectional view of the detent apparatus in FIG. 5.

The slide 110 is slidably mounted on the chassis by two guide pins 112*a* and 112*b* that fit loosely into two holes 113*a* and 113b (FIG. 4) and is located under five operating buttons of the machine pivotally mounted on a rod 27. These include the rewind button 32, the stop button 33, the forward button 34, the fast forward button 35, and the record button 36 (FIG. 2). The latter has an extension 36*a* extending downwardly and into position to engage the sloping edge 110*a* of the slide 110 (FIG. 4).

A slide 21 is mounted on two guide pins 17*a* and 17*b* attached to the chassis and loosely inserted into two holes 22*a* and 22*b* in the slide 21. At one end of the slide 21 is a lateral extension 21*c* so formed and located as to engage the bar 14 adjacent the feeler 14*a*. The slide 21 also has a pair of projections 21*a* and 21*b* at the other end as well as a laterally extending flat portion 21*d* having a slot 21*f*. The slot engages the actuator 9' of the switch 9 that controls whether the apparatus is in its teaching condition or its normal condition.

Figure 3:
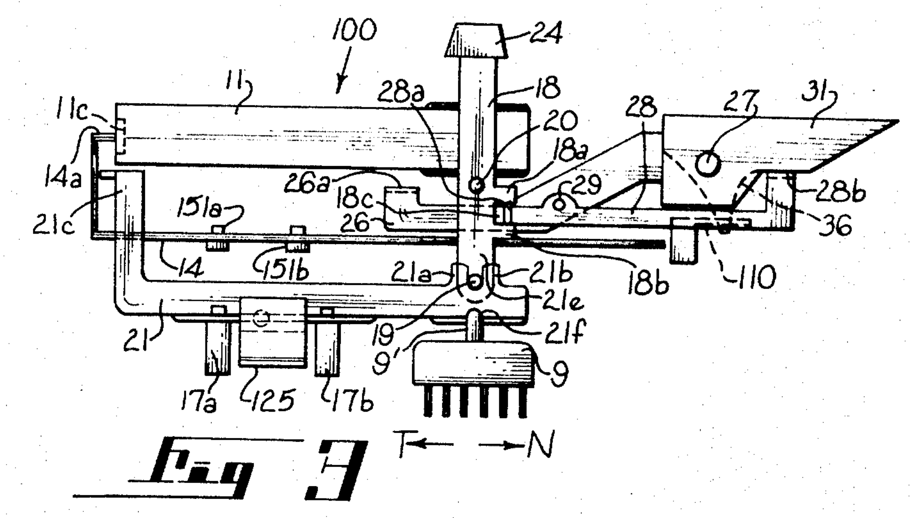
FIG. 3 is a side view of the apparatus in FIG. 2.

A lever 18 pivotally mounted on a pin 20 as is particularly shown in FIG. 3 has a control knob 24 at its upper end. The lever 18 also has a pin 19 that is inserted into a slot 21*e* between the projections 21*a* and 21*b*, and it further has a pair of projections 18*a* and 18*b* spaced apart and forming a slot 18*c* therebetween. An internal lever 28 is pivoted about a shaft 29 and is provided with a bent portion 28*a* that fits into the slot 18*c* of the lever 18. At the other end of the lever 28 is a flat extension 28*b* that extends under an ejecting button 31. The latter is pivotally mounted on a shaft 27 and has a lever 26 extending therefrom and provided with the flat plate portion 26*a* under the location of the cassette 11 so that when the button 31 is depressed, the front edge of the cassette will be raised out of its operative position and the cassette thus ejected.

The slide 21 is capable of moving between two positions: the forward one corresponding to normal operation of the mechanism and the other or rearward position corresponding to teaching or instructional operation and in which the slide 21 acts as a blocking means to block or prevent detection, by the feeler 14*a*, of the absence of a tab on the cassette. A detent mechanism 125 holds the slide 21 in either of these two positions. This detent mechanism is shown to a limited extent in FIGS. 2 and 3 but is shown in greater detail in the exploded view in FIG. 5 and in a cross-sectional view in FIG. 6. As shown there, the detent mechanism comprises a flat plate portion 21*g* extending laterally from the slide 21 and having a hole 126 therein in which a ball 127 is loosely inserted. A plate 128 having two openings 129*a* and 129*b* is connected by means of a screw to another plate 130 of generally similar shape. The distance between the plates 128 and 130 is less than the diameter of the ball 127 so that as the slide 121 moves longitudinally back and forth, which is the direction perpendicular to the cross-sectional view in FIG. 6, the plates 128 and 130 are deflected slightly to allow the ball to move across the solid portion from one of the holes 129*a* to the other hole 129*b* and back again, depending upon the direction of operation of the lever 18. When the ball 127 reaches either of the holes 129*a* or 129*b*, it tends to fit into that hole and to prevent any further longitudinal movement of the slide 21.

The carriage 102 is operated by pushing the forward button 34 down to engage the magnetic heads 4 and 5 and the pinch roller 105 with the tape in the cassette 11. This also causes the switch 8 (shown only in FIG. 1) to be moved to its playback position. On the other hand, when the recording button 36 is depressed, the switch 8 is turned to the recording position as shown in FIG. 1.

The operation of the structure of FIGS. 2–6 will now be described. FIGS. 2 and 3 show the apparatus as set for instructional use. The slide 21 has been shifted toward the rear of the cassette 11, that is, toward the side on which the tab 11*c* is located and away from the front face of the cassette through which the magnetic heads 4 and 5 engage the tape. The shifting of the slide 21 is accomplished by pivoting of the lever 18 about the pin 20, which causes the pin 19 to press against the projection 21*a*. As a result of this movement of the slide 21, the feeler 14*a* is pushed back from the rear surface of the cassette 11 against the biasing force of the spring 15. The slide 21 is kept in its rearward position because the detent ball 127 falls into the opening 129*a* of the plate 128.

In this condition, if the recording button 36 and the forward button 34 are both depressed, the switch 8 (FIG. 1) will be moved to the recording condition and contact will be made between the movable contacts 8*a*–8*d* and the fixed contacts marked R. Under this condition, the head 4 reproduces the teaching program TP from the track 10a and the head 5 records the student's own signal SP on the track 10*b*. Thereafter, if the forward button 34 is the only button depressed, the switch 8 will be actuated so that the contacts 8*a*–8*d* move to the playback position and make contact with the fixed terminals P. In this condition, both the heads 4 and 5 serve to reproduce the signals TP and SP from the tracks 10*a* and 10*b*, respectively.

In order to change the operation of the apparatus from teaching or instructional use to use as a normal cassette recorder/playback apparatus, the ejection button 31 is depressed to eject the instructional cassette 11 by pressure on the lower surface of it by the plate 26*a*. At the same time, the internal lever 28 is rotated clockwise, as viewed on FIG. 3 by the depression of the ejection button 31 and the resultant force on the portion 28*b* of the internal lever. This movement of the lever 28 is coupled by the bent end 28*a* to the lever 18 to cause rotation of the latter. As a result, the slide 21 is shifted to the right with respect to the position shown in FIG. 3, its movement being constrained by the guide pins 17*a* and 17*b*. This shifting of the slide 21 is coupled by means of the actuator 9' to the switch 9 to change the latter to the normal condition indicated by N in FIGS. 1–3. Thus, the switch 9 automatically returns to the normal use position each time a cassette 11 is ejected.

Movement of the slide 21 allows the bar 14 to return to its original position under the force of the spring 15 to bring the feeler 14*a* in position to determine whether a tab 11*c* is in place or not. The movement of the slide 21 that permits movement of the bar 14 causes the slide to become locked in its alternative position by means of the detent 125. In this alternative position, the ball 127 is in the hole 129*b*.

After any cassette has been ejected by the ejection button 31, the apparatus will be in position to accept either a regular cassette or an instructional cassette. If a prerecorded regular cassette is placed in the machine, the operation of the feeler 14*a* in determining that the tab 11*c* of that cassette has been removed will prevent the mechanism from being set to record new information on the tape in that prerecorded cassette. For example, if such a cassette were in place, the bar 14 would slide in the direction toward the front of the cassette, that is, toward the buttons 32–36 to the alternative position indicated in broken lines on FIG. 2. In this alternative position, it is directly in front of the slide 110. If an attempt is made to depress the recording button 36, the extension 36*a* will press against the sloping side 110*a* of the slide 110 and attempt to force the slide to the left with respect to the position in which it is shown in FIG. 2, but such leftward movement will be prevented by interference with the end 14*b* of the bar 14.

On the other hand, if the tab 11*c* is still present, the bar 14 cannot move to the alternative position and will not be in position to stop the leftward movement of the slide 110 in response to pressure of the extension 36*a* on the sloping edge 110*a*. As a result of depressing the recording button 36, the switch 8 (FIG. 1) will be in its "record" condition.

Figure 7:
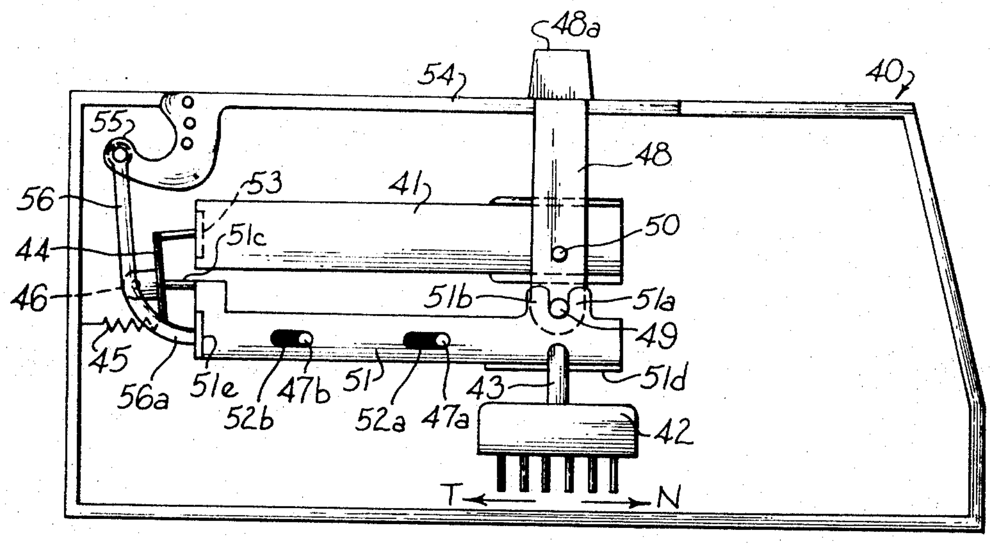
FIG. 7 shows the interlocking mechanism of a different embodiment of the invention.

In the embodiment of the invention shown in FIG. 7, a feeler 44 is pivoted about a pin 46 and is resiliently biased by a spring 45 that urges the lever to rotate clockwise. A slide 51 is guided so as to be able to move in the horizontal plane and is contrained by two guide pins 47*a* and 47*b* inserted into holes 52*a* and 52*b* in the slide 51. The slide has an extension 51*c* that can engage the feeler 44, and it has a pair of projections 51*a* and 51*b* and a slot 51*d* at the other end of the slide. A switch 42, which corresponds to the switch 9 in FIG. 1 and serves to set the operation of the mechanism for either instructional use or normal use, has an actuator 43 inserted into the slot 51*d* of the lever 51. A change lever 48 is pivoted about a pin 50 and has a button 48*a* at its upper end and a transverse pin 49 at the lower end. The pin 49 is inserted between the projections 51*a* and 51*b* to couple the lever 48 to the slide 51.

The cassette recording/playback mechanism 40 has a cover 54 that encloses the mechanism and extends over a cassette 41. The cover 54 is fixed to a shaft 55 to rotate therewith. This shaft is rotatably mounted within the housing of the apparatus 40. A lever 56 is also affixed to the shaft 55 so as to rotate therewith when the cover 54 is rotated. An extension 56*a* at the lower end of the lever 56 is placed to engage a plate 51*e* bent at right angles to the end of the slide 51.

The mechanism in FIG. 7 is set for instructional use by pivoting lever 48 to the position shown. The slide 51 is shifted to the left by the lever 48 so that the feeler 44 is in its counterclockwise position against the pressure of the spring 45. The feeler 44 is shifted to this counterclockwise position by the pressure of the extension 51*c* of the lever 51. Further, the actuator 43 of switch 42 is displaced to set the switch for instructional use. In this condition, the recorder/playback mechanism 40 is capable of either recording on tape in the cassette 41 or reproducing material previously recorded thereon. This is independent of whether or not the cassette 41 has a tab 53 that would normally prevent the recording mechanism from being operated. This is the condition desired for use with instructional cassettes.

When it is desired to use the apparatus in FIG. 7 for an ordinary cassette, the instructional cassette 41 must be ejected by means which may be of the type shown in FIGS. 2 and 3. When the cassette 41 is released, the cover 54 is rotated counterclockwise by pressure from the cassette. The lever 46 is also rotated counterclockwise by the shaft 55. As a result, the slide 51 will be shifted to the right under pressure exerted by the extension 56*a*. This will cause the switch 42 and the change lever 48 to be moved to their normal positions. This permits the feeler 44 to return to its original position in response to the force of the spring 45.

Accordingly, if a conventional cassette having no tab is inserted into the operation position, the feeler 44 will detect the absence of the tab and prevent the recording button, such as the button 36 of FIGS. 2–4, from being depressed. On the other hand, if the cassette does have a tab, recording may be done. Thus, improper use of the recording portion of the mechanism is prevented.

Figure 8:
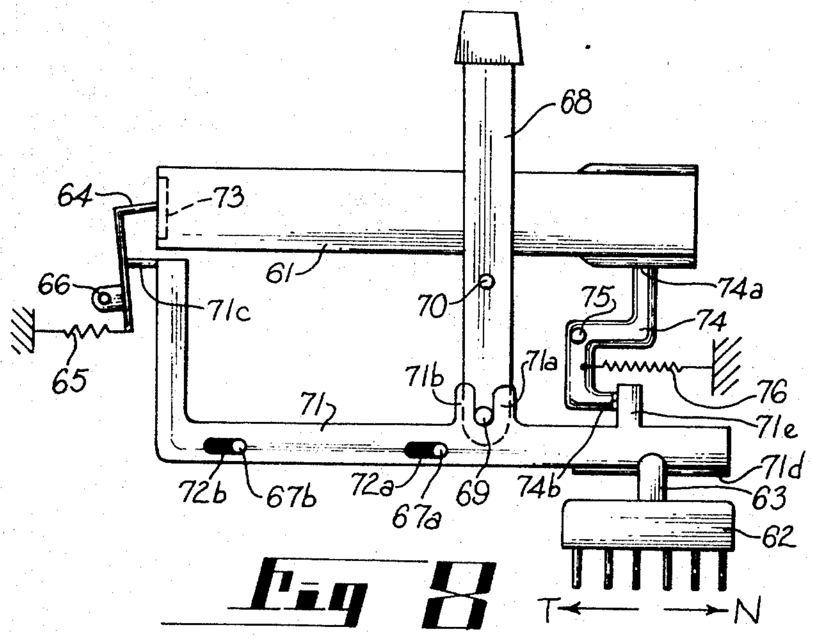
FIG. 8 shows another interlocking mechanism of still another embodiment of the invention.

FIG. 8 shows still another embodiment of the present invention. A feeler 64 is pivotally mounted on a pin 66 and is biased by a spring 65 to tend to rotate clockwise. The end of the feeler 64 is aligned with the position of a tab 73 on a cassette 61. A slide lever 71 has an extension 71*c* at one end to engage the feeler 64 and prevent it from being operated by the presence or absence of a tab 73 on the cassette. Two projections 71*a* and 71*b* enable the slide to engage a pin 69 of a change lever 68. The slide 71 also has a slot 71*d* that engages the actuator 63 of a switch 62 which corresponds to the switch 9 in FIG. 1. The slide 71 also has another projection 71*e* that engages a bell crank lever 74 pivotally mounted on a pin 75. The other end 74*a* of the lever 74 presses against the underside of the cassette 61 in response to the force of a spring 76.

As in the previous embodiments, the apparatus in FIG. 8 is shown in condition for instructional use. The slide 71 has been shifted to the left by the lever 68 so that the extension 71*c* presses the feeler 64 away from the rear surface of the cassette 61. As a result, the recording part of the mechanism may be operated whether or not the cassette has a tab 73. Moreover, in this condition, the lever 74 is depressed by the lower surface of the cassette 61 so that it is biased clockwise against the force of the spring 76.

In order to use the apparatus for conventional cassettes, the cassette 61 must be released from its operative position. This may be done by the cassette ejection means shown in FIGS. 2 and 3. When the cassette is ejected, the lever 74 is rotated counterclockwise by the spring 76 causing the slide 71 to be shifted to the right by pressure of a tab 74*b* against the projection 71*e*. This causes the switch 62 and the lever 68 to be returned to their original positions for normal use and allows the feeler 64 to return to its original position under the force of the spring 65. In that position, the feeler is able to detect whether or not the tab 73 on the next cassette placed in the operative position of the cassette 71 has been removed and thus to determine whether or not recording should be permitted on the tape of that cassette. Thus, removal of a cassette returns the mechanism to the proper condition to accept conventional or instructional cassettes and to determine whether such cassettes have permanently prerecorded material thereon that should not be erased or recorded over.

While the invention has been described in terms of specific embodiments, it will be understood that various modifications may be made therein. For example, the circuit in FIG. 1 may be arranged to permit the magnetic head 5 to record and play back signals on the track 10b when the apparatus is set for normal use. In addition, the slide 21 and the lever 18 attached to it may be constructed together.

What is claimed is:

1. In a magnetic recording and reproducing device for use with a magnetic tape cassette having removable tab means at a predetermined location on the cassette to indicate by its absence or presence whether information recorded on the tape in said cassette is permanent or can be erased, the combination of:

A. Magnetic head means operative selectively to record signals on the tape in a cassette at an operative position on the device or to reproduce signals previously recorded on such tape;
B. Feeler means operative for detecting the presence or absence of said tab means on a cassette at said operative position;
C. Means to prevent the selective operation of said magnetic head means for recording signals on the tape in response to the detection by said feeler means of said absence of the tab means from a cassette at said operative position;
D. Blocking means movable in one direction for blocking said detection by said feeler means of the absence of the tab means on a cassette so that said magnetic head means is then selectively operable to record or reproduce signals on the tape in such cassette irrespective of the presence or absence of the tab means thereon;
E. Ejecting means operative for ejecting a cassette from said operative position; and
F. Means moving said blocking means in the opposite direction in response to the operation of said ejecting means for permitting said feeler means to detect the presence or absence of the tab means on a cassette subsequently disposed at said operative position on the device.

2. The device as set forth in claim 1; further comprising amplifying means, and switching means connecting said amplifying means and said magnetic head means and being actuated from said ejecting means upon operation of the latter to return to a predetermined condition each time a cassette is ejected from said operative position on said device.

3. The device as set forth in claim 2 in which said amplifying means has an input circuit and an output circuit, said magnetic head means comprises first and second magnetic heads, and said switching means includes means to connect said first head alternatively to said input circuit of said amplifyting means or to said output circuit of said ampliying means or to connect said first head to said input circuit while said second head is connected either to said input circuit or to said output circuit.

4. The device as set forth in claim 1; in which said feeler means includes a feeler element movably mounted adjacent the location of the tab means on a cassette when the latter is in said operative position and resilient means urging said feeler element to move in the direction toward said location so that the presence of said tab means on the cassette limits the movement of said feeler element in said direction; and in which said blocking means, when moved in said one direction, engages said feeler element to block said movement thereof in said direction toward the location of the tab means.

5. The device as set forth in claim 1; futher comprising amplifying means having an input circuit and an output circuit, and in which said means to prevent the selective operation of said magnetic head means includes:

A. Switching means to connect said output circuit of the amplifying means to said magnetic head means;
B. Manually operable means to control said switching means; and C. Interlock means connecting said manually operable means to said feeler means to permit said manually operable means to be operated only when said feeler means detects the presence of the tab means on a cassette at said operative position on the device.

6. The device as set forth in claim 5, in which said interlock means comprises a sliding member engaging said manually operable means to be moved thereby in a predetermined direction, and said feeler means includes a rod slidable in a direction transverse to said sliding member and into the path of said sliding member when said tab means is absent, whereby said manually operated means cannot be operated when said tab means is absent.

7. The device as set forth in claim 1, in which said magnetic head means includes first and second magnetic heads, and said device further comprises:

A. Amplifying means having an input circuit and an output circuit;

B. A first multi-pole switch actuable between a recording position and a playback position; and C. A second multi-pole swtich actuable between a first condition and a second condition, said switches being interconnected with each other and with said amplifying means and said first and second magnetic heads whereby, when said second switch is actuated to said first condition, said first magnetic head is connected to said input circuit of said amplifying means and said second magnetic head is connectable by said first switching means either to said input circuit of said amplifying means or to said output circuit of the amplifying means.

8. The device as set forth in claim 7 in which said second switching means comprises connections such that when said second switching means is in said second condition said first magnetic head is switchable either to said input circuit or to said output circuit by said first switching means.

9. The device as set forth in claim 8, in which said blocking means comprises sliding means engaging said second switch to actuate the same, and a handle coupled with said sliding means to move said sliding means in said one direction to a first position and in said opposite direction to a second position corresponding, respectively, to said first and second conditions.

10. The device as set forth in claim 9 comprising, in addition:

A. A cover for said operative position;

B. Pivotal mounting means for said cover; and

C. Means rigidly engaged with said pivotal mounting means and engageable with said sliding member.

11. The device as set forth in claim 9 comprising, in addition, a bell crank lever engageable with said sliding member and resiliently urged thereagainst and having an arm extendable into contact with a cassette in said operative position on the device, said lever pivoting when said cassette is ejected, thereby to force said sliding member into position to place said second switch in said second condition.

* * * * *